United States Patent [19]

Simmons et al.

[11] Patent Number: 4,483,715

[45] Date of Patent: Nov. 20, 1984

[54] METHOD FOR REMOVING DIBASIC CALCIUM HYPOCHLORITE SCALE

[75] Inventors: Robert B. Simmons, Norton, Ohio; David A. Stermole, New Martinsville, W. Va.

[73] Assignee: PPG Industries, Inc., Pittsburgh, Pa.

[21] Appl. No.: 519,439

[22] Filed: Aug. 1, 1983

[51] Int. Cl.$^3$ .................. B08B 3/08; C01B 11/06
[52] U.S. Cl. ..................... 134/2; 134/22.1; 134/22.16; 134/22.17; 423/474
[58] Field of Search .......... 423/474; 134/2, 22.1, 134/22.13, 22.17, 28, 22.16

[56] References Cited

U.S. PATENT DOCUMENTS

| | | | |
|---|---|---|---|
| 888,122 | 5/1908 | Schultze | 423/474 |
| 2,320,635 | 1/1940 | Mericola et al. | 23/86 |
| 2,368,042 | 1/1945 | Robson | 23/86 |
| 2,429,531 | 10/1947 | Soule et al. | 23/86 |
| 2,441,337 | 5/1948 | Sprauer | 23/86 |
| 3,030,177 | 4/1962 | Mohan, Jr. | 23/86 |
| 3,094,380 | 6/1963 | Bruce | 23/86 |
| 4,258,024 | 3/1981 | Hoffer et al. | 423/474 |
| 4,328,200 | 5/1982 | Welch et al. | 423/474 |
| 4,390,512 | 6/1983 | Loehr et al. | 423/474 |

*Primary Examiner*—John Dell
*Assistant Examiner*—Steven Capella
*Attorney, Agent, or Firm*—Irwin M. Stein

[57] ABSTRACT

Dibasic calcium hypochlorite scale found on the surfaces of process equipment used for the manufacture of calcium hypochlorite is removed chemically by submerging the scale in water, thereby to form an aqueous alkaline solution, and controllably adding hydrochloric acid to the alkaline solution under conditions of agitation and while maintaining the pH of the solution at at least 7, thereby to solubilize the dibasic calcium hypochlorite scale without producing substantial amounts of elemental chlorine.

15 Claims, No Drawings

METHOD FOR REMOVING DIBASIC CALCIUM HYPOCHLORITE SCALE

DESCRIPTION OF THE INVENTION

The present invention relates to the manufacture of neutral calcium hypochlorite. This material enjoys a major portion of the market for available chlorine compounds, aside from chlorine itself, because it is the cheapest and most stable solid composition known which delivers all of its available chlorine immediately on contact with oxidizable materials. Calcium hypochlorite compositions containing at least 65 percent of available chlorine have been on the market for many years and are used primarily as commercial bleaching and sanitizing agents. Such compositions are used particularly for disinfecting swimming pool water.

A variety of processes for manufacturing calcium hypochlorite from lime and alkali, e.g., sodium hydroxide, have been proposed. Some of these processes, such as those described in U.S. Pat. Nos. 2,320,635, 2,368,042, 3,094,380, 4,258,024 and 4,328,200, utilize dibasic calcium hypochlorite as the source of lime which is chlorinated to produce calcium hypochlorite. That reaction can be depicted by the following balanced equation:

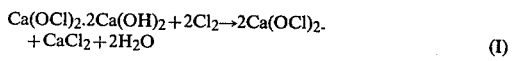

$$Ca(OCl)_2 \cdot 2Ca(OH)_2 + 2Cl_2 \rightarrow 2Ca(OCl)_2 + CaCl_2 + 2H_2O \qquad (I)$$

In other described processes for producing neutral calcium hypochlorite, the process conditions used may favor the formation of dibasic calcium hypochlorite.

Process liquor temperatures used in the preparation of calcium hypochlorite are typically less than 35° C., e.g., between about 10° C. and 30° C., to avoid decomposition of the hypochlorite product. Dibasic calcium hypochlorite is only slightly soluble in water at such temperatures. Consequently, dibasic calcium hypochlorite scale can be formed on the surfaces of process equipment used in the manufacture of calcium hypochlorite. Such scale can adhere tightly to such surfaces and grow to the point where its removal is required. Removal of such scale has been accomplished mechanically, e.g., by hydroblasting the scale away from the surfaces to which it adheres. The scale which is removed can be wet milled, and the milled material reintroduced into the process.

Removal of dibasic calcium hypochlorite scale chemically by contacting the scale with acid, e.g., hydrochloric acid, under acidic conditions causes the generation of elemental chlorine by the acid-calcium hypochlorite reaction depicted by the following overall balanced equation:

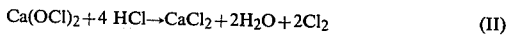

$$Ca(OCl)_2 + 4 HCl \rightarrow CaCl_2 + 2H_2O + 2Cl_2 \qquad (II)$$

Such chlorine can readily exit the aqueous solution as chlorine gas, which would require additional precautions and equipment to avoid release of such chlorine gas to the environment. Typically, the gas released would be collected and conveyed to a scrubbing column where it would be neutralized with an alkaline reagent, e.g., sodium hydroxide. The loss of chlorine in this manner also reduces the amount of calcium hypochlorite which is potentially recoverable as product from the dibasic calcium hypochlorite scale. Finally, acidic conditions in the reaction of hydrochloric acid with dibasic calcium hypochlorite also favors the formation of calcium chlorate. If the aqueous solution formed by neutralization of dibasic calcium hypochlorite is recycled to another part of the process, the calcium chlorate present therein can increase the level of this impurity within the calcium hypochlorite product. Further, the formation of calcium chlorate also reduces the amount of calcium hypochlorite potentially recoverable by the process of the present invention.

It has now been found that dibasic calcium hypochlorite scale can be removed chemically without producing substantial amounts of chlorine gas. More particularly, dibasic calcium hypochlorite scale deposited on the surfaces of process equipment used for the production of calcium hypochlorite can be removed by submerging the surface containing the dibasic calcium hypochlorite scale in water, and controllably adding acid, e.g., hydrochloric acid, under conditions of agitation to the resulting alkaline aqueous solution while maintaining the pH of said solution at at least about 7. In another embodiment, the surface containing the dibasic calcium hypochlorite scale is covered initially with a mildly acidic aqueous medium. Upon dissolution of dibasic calcium hypochlorite scale, there results an aqueous solution in contact with the remaining scale, which solution has a pH of at least about 7. In a further embodiment, the water in contact with the scale is removed from the vessel and passed through a second vessel, e.g., a column, containing a source of hydrogen ions (acid protons), thereby to add such ions to the water, and the resulting acid proton-containing water recycled to the vessel containing the scale. In this manner, hydrogen ions are brought into contact with the ions resulting from dissolution of the dibasic calcium hypochlorite scale.

In a preferred embodiment, the process equipment, e.g., a process vessel containing the dibasic calcium hypochlorite scale, is drained of process liquor contained therein. Subsequently, the vessel is filled with water so as to cover with water the surfaces of the vessel to which the scale is adhering. A small amount of the dibasic calcium hypochlorite scale is solubilized, thereby forming an aqueous alkaline solution. A source of acid is then added controllably under conditions of agitation and in a manner to maintain the pH of the aqueous solution at at least about 7. In this manner, the dibasic calcium hypochlorite scale is solubilized from the surfaces of the process equipment without producing substantial amounts of chlorine gas.

DETAILED DESCRIPTION OF THE INVENTION

The presence of dibasic calcium hypochlorite scale in process equipment used for the production of calcium hypochlorite can present operational problems in the functioning of such equipment as well as be the source of a potential loss of calcium values from the system. In the former, scale buildup can result in the plugging of process lines and significant loss in working volume in process vessels. In the latter, dibasic calcium hypochlorite which could be converted to neutral calcium hypochlorite product is potentially lost. Removal of the scale mechanically followed by wet milling so that the dibasic salt can be recycled within the process requires extra equipment, adds to the cost of the process and is time consuming.

The process of the present invention provides a chemical means for dibasic calcium hypochlorite scale removal which utilizes readily available materials from the calcium hypochlorite process and recovers directly calcium hypochlorite that can be readily assimilated within the process. Moreover, the present process does not produce significant amounts of free chlorine.

In accordance with the present invention, process liquor is removed from the dibasic calcium hypochlorite scale within the process equipment, e.g., by draining the process vessel or process line. Thereafter the process liquor is replaced with an aqueous medium having a pH of at least 7 in amounts sufficient to cover the dibasic scale and a source of hydrogen ions (acid protons) is introduced into the aqueous medium. The aqueous medium can be provided by filling the process equipment with water, thereby forming an aqueous alkaline solution as a result of the dibasic salt scale dissolving to the extent of its solubility at the temperature of the water. Alternatively, the aqueous medium can be a very dilute aqueous acidic solution, e.g., an acid concentration of 0.01 weight percent. Such aqueous medium quickly attains a pH of greater than 7 due to the interaction of the acid protons with the hydroxyl anions provided by the solubilized dibasic salt.

The source of acid protons introduced into the aqueous alkaline solution in contact with the dibasic scale can be provided by an inorganic mineral acid or a material which forms the acid, i.e., elemental halogen, e.g., chlorine. Inorganic mineral acids that can be used include: sulfuric acid, nitric acid, phosphoric acid, hydrogen halides, e.g., hydrochloric acid, and the hypohalo acids, e.g., hypochlorous acid. Preferably, hydrochloric acid, hypochlorous acid or chlorine are used to provide the source of acid protons so as not to introduce anions foreign to the calcium hypochlorite process.

In a further embodiment, the acid protons can be provided by a cation exchange resin or membrane, preferably a strong cation exchange material. The aqueous alkaline solution from the process equipment can be brought into contact with the cation exchange material, e.g., by circulating the aqueous solution through a vessel, e.g., a column, containing the material. In this manner hydrogen ions are released into the circulating aqueous solution and recycled to the process vessel or process line containing the dibasic calcium hypochlorite scale. In a still further embodiment, the acid protons can be provided by bleeding chlorine or acid, e.g., hydrochloric acid, slowly into the circulating aqueous alkaline solution.

The acid protons, whether by addition of mineral acid, elemental halogen, e.g., chlorine, or contact with a cation exchange material are added controllably and slowly under conditions of agitation to the aforesaid aqueous alkaline solution. The manner of addition is such so as to maintain the pH of the aqueous medium at at least about 7. This addition of acid protons (hydrogen ions) to an aqueous alkaline solution containing the inorganic ions resulting from the dissolution of the dibasic calcium hypochlorite scale results in the generation of calcium hypochlorite and calcium chloride in accordance with the overall following balanced equation:

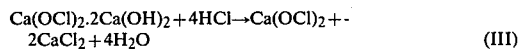

$$Ca(OCl)_2 \cdot 2Ca(OH)_2 + 4HCl \rightarrow Ca(OCl)_2 + 2CaCl_2 + 4H_2O \quad (III)$$

The calcium hypochlorite-containing composition thereby produced can be recycled or forwarded to a point in the neutral calcium hypochlorite manufacturing process compatible with that composition.

The pH of the aqueous alkaline solution to which hydrogen ions, e.g., hydrochloric acid, is added is monitored carefully so that the pH is maintained at at least about 7. Typically, the pH is between about 7 and about 10.5, more preferably between about 7.7 and 10, and still more preferably between about 9 and 10, e.g., about 9.5. When the pH of the aqueous solution is acidic, it has been found, as discussed previously, that elemental chlorine is formed. The lower the pH of the aqueous solution, i.e., the more acidic the solution, the greater is the tendency for elemental chlorine to be formed.

The amount of hydrogen ions, e.g., hydrochloric acid, added to the aqueous alkaline solution will depend, of course, on the amount of dibasic calcium hypochlorite scale within the process equipment that requires removal or is to be removed. The amount of hydrogen ions added will be in substantially stoichiometric amounts, i.e., 90 to 110 percent of the stoichiometric amount required by balanced equation III. This equation is based on the use of hydrochloric acid and, of course, if a source of hydrogen ions other than such acid is used, equation III would be modified accordingly.

The rate at which hydrogen ions are added to the aqueous alkaline solution will vary and will depend on the pH or pH range at which the solution is to be maintained, the rate at which the dibasic scale is solubilized, and the relative concentration of the hydrogen ion source. The higher the concentration of acid, the slower the addition rate and vice versa. Monitoring the pH of the solution is readily accomplished by use of an industrial type pH meter. The meter can be associated with electronic reading and recording means for continuous reading and printing of the pH condition sensed by the meter within the vessel. The electronic sensing means can also be connected to a pneumatic control system which automatically operates a valve in the acid proton feed line, i.e., the mineral acid (hydrochloric acid) or halogen (chlorine) feed line. When a cation exchange material is used, the rate at which the aqueous alkaline solution is circulated through the material will function to control the rate of acid proton addition.

The acid, e.g., hydrochloric acid, can be of any suitable concentration. For hydrochloric acid, the concentration can vary from 0.01 to 36 weight percent. If the acid is very dilute, a large amount of water is added to the system which either adds to the evaporation heat load in the process or increases the disposal cost of the neutralized dibasic calcium hypochlorite scale. If the acid used is highly concentrated, e.g., anhydrous hydrogen chloride, care should be observed to add same slowly and with agitation to avoid areas of localized concentrated acid. Typically, the volume of the aqueous alkaline solution is large enough to provide sufficient capacity to absorb the concentrated acid readily without generating localized areas of concentrated acid. When the amount of water introduced into the manufacturing process is not critical, acid, e.g., hydrochloric acid, having a concentration within the range of from about 5 to 20 weight percent, can be used.

As described, the source of acid protons can be introduced into the aqueous alkaline solution by slowly bubbling halogen, e.g., chlorine, gas into the solution. Chlorine, for example, will react with water to form hypochlorous acid and hydrogen chloride which will furnish the desired acid protons. Use of halogen, e.g., chlorine, gas in this manner is suitable principally when the process equipment is a fairly large vessel which is filled with the aqueous alkaline solution. The gas is introduced near the bottom of the vessel very slowly, thereby giving the halogen gas time to dissolve within the alkaline solution to form the corresponding acids. Although halogens other than chlorine can be used, e.g., bromine and iodine, chlorine is the preferred halogen because of cost and compatability with the chemical species already in the process. As used in the herein specification and claims, the term hydrochloric acid is intended to mean and include the in situ generation of hydrochloric acid by the introduction of chlorine gas into the aqueous alkaline solution.

The acid source added to the aqueous alkaline solution is typically introduced under conditions of agitation so as to disperse the acid source immediately upon its introduction, thereby to avoid localized areas of high acidity. If a separate column is used to introduce the acid source into circulating aqueous alkaline solution, the mixing obtained by the circulating liquid is usually adequate to avoid localized areas of high acidity. The acid source is preferably introduced below the surface of the aqueous alkaline solution and preferably near the bottom of such solution, e.g., by means of dip tube. The acid source is added in a controlled and gradual manner, as described above, so that the alkalinity of the solution can be monitored by the aforedescribed industrial type pH meter and associated control system. The higher the pH of the aqueous solution, the faster the rate of acid addition which can be tolerated; however, the closer the pH of the solution to a pH of 7, the greater the degree of care required to avoid the generation of free chlorine.

The water used for the aqueous medium and aqueous alkaline solution of the present process can be process water used in the neutral calcium hypochlorite manufacturing process. The temperature of the water and thus the resulting aqueous alkaline solution should be compatible with the temperatures used in the calcium hypochlorite manufacturing process. Typically, the temperature of the aqueous alkaline solution will be less than 35° C., more typically between about 10° C. and about 30° C., e.g., between 15° C. and about 25° C. Such temperatures minimize the loss of calcium hypochlorite due to temperature induced decomposition.

As indicated in equations I and III, the reaction of dibasic calcium hypochlorite with hydrochloric acid or chlorine results in the production of calcium chloride. This salt can represent an objectionable impurity in the neutral calcium hypochlorite product. If it is found that the amount of calcium chloride generated by the reaction of solubilized dibasic calcium hypochlorite with the acid source, the products of which are reintroduced into the calcium hypochlorite manufacturing process, is too high, the calcium chloride can be reacted with sodium hypochlorite, as is well known, in accordance with the following equation:

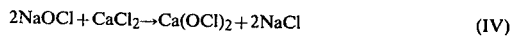

$$2NaOCl + CaCl_2 \rightarrow Ca(OCl)_2 + 2NaCl \qquad (IV)$$

The sodium hypochlorite can be readily produced by the reaction of chlorine with sodium hydroxide. The amount of sodium hypochlorite added to the aqueous alkaline solution should be in amounts substantially stoichiometric to the amount of calcium chloride generated in the aqueous alkaline solution. The mole ratio of sodium hypochlorite to calcium chloride can range between about 1.5:1–2.5:1, more typically between 1.9:1 and 2.1:1. The aforesaid reaction produces further calcium hypochlorite which can be added to the neutral calcium hypochlorite manufacturing process.

It is contemplated that the process of the present invention is performed in accordance with the following preferred embodiment. A process vessel utilized for the production of calcium hypochlorite and containing dibasic calcium hypochlorite scale is drained of the process liquor contained therein to thereby expose the dibasic calcium hypochlorite scale. Water at about 20° C. is added to the process vessel until the dibasic scale is covered. The contents of the vessel are agitated and hydrochloric acid of about 36 weight percent is added slowly while maintaining the pH of the aqueous solution at about 9.5. Addition of hydrochloric acid continues until the pH of the aqueous solution begins to drop and remain below 9.5. The contents of the vessel are then drained and the process liquor previously drained from the vessel returned thereto. The aqueous alkaline solution drained from the vessel is recycled to a point in the calcium hypochlorite process that is compatible with the temperature and composition of that solution.

Although the present process has been described with reference to specific details of certain embodiments thereof, it is not intended that such details should be regarded as limitations upon the scope of the invention except as and to the extent that they are included in the accompanying claims.

We claim:

1. A process for removing dibasic calcium hypochlorite scale deposited on the surfaces of equipment used for the production of calcium hypochlorite, which comprises submerging the surface containing the dibasic calcium hypochlorite scale in an aqueous medium selected from the group consisting of water and dilute aqueous acidic solution, thereby to form an aqueous alkaline solution containing solubilized dibasic calcium hypochlorite, adding a source of hydrogen ions under conditions of agitation to said aqueous alkaline solution while maintaining the pH of said aqueous solution at at least about 7, there by to solubilize the dibasic calcium hypochlorite scale from the surfaces of said equipment.

2. The process of claim 1 wherein the source of hydrogen ions is selected from the group consisting of hydrochloric acid and chlorine.

3. The process of claim 2 wherein the concentration of the hydrochloric acid is between 0.01 and 36 weight percent.

4. The process of claim 3 wherein the hydrochloric acid concentration is between 5 and 20 weight percent.

5. The process of claim 1 wherein the pH of the aqueous alkaline solution is maintained at between 7.5 and 10.5.

6. The process of claim 2 wherein the pH of the aqueous alkaline solution is maintained at between 7.5 and 10.5.

7. A process for removing dibasic calcium hypochlorite scale deposited on the surface of a vessel used in the process for producing neutral calcium hypochlorite, which comprises (a) draining the process liquor from the vessel, (b) adding water to the vessel in amount sufficient to cover the scale, thereby to form an aqueous alkaline solution containing solubilized dibasic calcium hypochlorite, and (c) adding under conditions of agitation hydrochloric acid to the aqueous alkaline solution while maintaining the pH of said aqueous solution at at least about 7, thereby to remove dibasic calcium hypochlorite scale from the surface of the vessel.

8. The process of claim 7 wherein the temperature of the water is between about 10° C. and 30° C.

9. The process of claim 7 wherein the hydrochloric acid has a concentration of between 0.01 and 36 percent.

10. The process of claim 7 wherein the pH of the aqueous alkaline solution is maintained at between about 7.5 and 10.5.

11. The process of claim 10 wherein the pH of the aqueous alkaline solution is maintained at between about 9 and 10.

12. The process of claim 7 wherein hydrochloric acid is added to the aqueous alkaline solution until the desired amount of dibasic calcium hypochlorite scale has been removed from the surface of the vessel and the resulting aqueous alkaline solution is drained from the vessel.

13. The process of claim 12 wherein the drained aqueous alkaline solution is recycled to a point in the proocess used to produce neutral calcium hypochlorite which is compatible with the composition of said drained aqueous alkaline solution.

14. The process of claim 12 wherein the resulting aqueous alkaline solution is treated with substantially stoichiometric amounts of sodium hypochlorite, based on the amount of calcium chloride in said solution.

15. The process of claim 12 wherein the hydrochloric acid has a concentration of between 0.01 and 36 percent and the pH of the aqueous alkaline solution is controlled at between 7.5 and 10.5 during addition of the hydrochloric acid.

* * * * *